US008862999B2

(12) United States Patent
Gupta et al.

(10) Patent No.: US 8,862,999 B2
(45) Date of Patent: Oct. 14, 2014

(54) DYNAMIC DE-IDENTIFICATION OF DATA

(75) Inventors: Ritesh K Gupta, Hyderabad (IN);
Prathima Nagaraj, Hyderabad (IN);
Sriram K. Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 12/951,453

(22) Filed: Nov. 22, 2010

(65) Prior Publication Data
US 2012/0131481 A1 May 24, 2012

(51) Int. Cl.
G06F 3/048 (2013.01)
G06Q 10/10 (2012.01)
G06F 17/30 (2006.01)

(52) U.S. Cl.
CPC .......... *G06Q 10/10* (2013.01); *G06F 17/30563* (2013.01)
USPC ............................. 715/736; 715/764; 715/741

(58) Field of Classification Search
USPC ......................................... 715/764, 736, 741
See application file for complete search history.

(56) References Cited

U.S. PATENT DOCUMENTS

| 7,519,591 | B2 | 4/2009 | Landi et al. |
| 7,761,594 | B1 | 7/2010 | Mowat |
| 8,001,607 | B2 | 8/2011 | Stull et al. |
| 8,176,563 | B2 | 5/2012 | Redlich et al. |
| 2007/0078871 | A1 | 4/2007 | Iverson et al. |
| 2008/0077604 | A1 | 3/2008 | Bharara |
| 2008/0275829 | A1 | 11/2008 | Stull et al. |
| 2009/0070291 | A1 | 3/2009 | Tadayon et al. |
| 2009/0132419 | A1* | 5/2009 | Grammer et al. ............... 705/50 |
| 2009/0132575 | A1 | 5/2009 | Kroeschel et al. |
| 2009/0163174 | A1 | 6/2009 | Baik et al. |
| 2009/0319588 | A1 | 12/2009 | Gandhi et al. |
| 2010/0042583 | A1* | 2/2010 | Gervais et al. .................... 707/3 |
| 2010/0095378 | A1 | 4/2010 | Oliver et al. |
| 2010/0205189 | A1 | 8/2010 | Ebrahimi et al. |
| 2010/0250497 | A1 | 9/2010 | Redlich et al. |
| 2012/0151597 | A1 | 6/2012 | Gupta |
| 2012/0266254 | A1 | 10/2012 | Gupta |
| 2012/0266255 | A1 | 10/2012 | Gupta et al. |

FOREIGN PATENT DOCUMENTS

EP 1637954 A1 3/2006

OTHER PUBLICATIONS

Dataguise Security Solutions for Sensitive Data, "Custom Solutions for Oracle E-Business Suite", Safely leverage production Oracle E-Business Suite data in test and development environments by masking sensitive data with dataguise dgmasker; Fremont, CA; www.dataguise.com.
Ulf Mattson, CTO, Protegrity, "Article: Developing, Deploying and Managing a Risk-Adjusted Data Security Plan", Apr. 2010 Newsletter; http://isaca-washdc.sharepointsite.net/resources/Articles/article-apr2010-print.htm; Copyright 2010—National Capital Area Chapter; pp. 1-4.

(Continued)

*Primary Examiner* — Andrea Leggett
(74) *Attorney, Agent, or Firm* — Susan Murray; Edell, Shapiro & Finnan, LLC

(57) ABSTRACT

The present invention relates to a method, computer program product and system for masking sensitive data and, more particularly, to dynamically de-identifying sensitive data from a data source for a target application, including enabling a user to selectively alter an initial de-identification protocol for the sensitive data elements via an interface.

12 Claims, 6 Drawing Sheets

(56) References Cited

OTHER PUBLICATIONS

Ishna Neamatullah et al., "Automated de-identification of free-text medical records", BMC Medical Informatics and Decision Making 2008, 8:32.

ContactCenterWorld; The Global Association for Contact Center Best Practices & Networking; "Dataguise Expands Sensitive Data Discovery and Masking Solution," ContactCenterWorld.com 1999-2010.

Kinetic Networks Innovative Information Management; Company Case Studies; http://kineticnetworks.com/company/cases.html; Kinetic Networks ~ Company—Success Stories; Copyright 2010 Kinetic Networks, Inc.

J. Peter Bruzzese, "Reasons to Protect Corporate Data", The Perils of Unprotected Production Data; Published Apr. 26, 2010; Feature—Techworld.com.

John Billman, "The Need for Secure and Compliant Test Data Environments," Wednesday, Dec. 5, 2007; Copyright 2010 Computer Technology Review—Data Storage, Networking and Data Center Solutions.

International Search Report and Written Opinion, PCT/EP2011/072197, Feb. 13, 2012, 8 pages.

Ahimanikya Satapathy, "Building an ETL Tool", SOA/Business Integration Sun Microsystems; pp. 1-26, http://wiki.open-esb.java.net/attach/ETLSE/ETLIntroduction.pdf, retrieved from Internet on or about Sep. 24, 2010.

Dale Edgar, "Data Sanitization Techniques", A Net 2000 Ltd. White Paper, copyright 2003-2004, 8 pages.

White Paper, "Dynamic Data Masking Introduction", Overview and Implementation Best Practice; Introduction to Dynamic Data Masking; copyright 2010 ActiveBase Ltd. pp. 1-7.

Iri, Inc., "Field Encryption, De-ID and Data Masking", www.cosort.com/products/FieldShield; copyright 2010 Innovative Routines International (IRI), Inc., 3 pages.

\* cited by examiner

DYNAMIC DE-IDENTIFICATION OF DATA

BACKGROUND

1. Technical Field

The present invention relates to a method and system for selectively de-identifying or masking data and, more particularly, to a technique for dynamically de-identifying or masking data upon discovery while preserving data usability across software applications.

2. Discussion of the Related Art

Across various industries, data (e.g., data related to customers, patients, or suppliers) is shared outside secure corporate boundaries. Various initiatives (e.g., outsourcing tasks, performing tasks off-shore, etc.) have created opportunities for this data to become exposed to unauthorized parties, thereby placing data confidentiality and network security at risk. In many cases, these unauthorized parties do not need the true data value to conduct their job functions. Examples of data requiring de-identification include, but are not limited to, names, addresses, network identifiers, social security numbers and financial data.

Conventional data de-identification or masking techniques are developed manually and implemented independently in an ad hoc and subjective manner for each application. Since it is not possible to consume sensitive fields and information into batch/real time processes, these processes, such as Extract/Transform/Load (ETL), are stand-alone processes in which live data is sourced in batch or real-time. Data requiring de-identification that is located within a data source is initially discovered and profiled by a separate discovery tool. Data de-identification or masking is defined by a user after manual review of the discovery tool output, and then applied to the data. Specifically, an ETL developer manually selects and enters various field types and corresponding de-identification or masking for an ETL process to enable the process to de-identify or mask those fields. The resulting de-identified or masked data is subsequently delivered to other environments.

BRIEF SUMMARY

According to an embodiment of the present invention, a computer-implemented method dynamically de-identifies data from a data source for a target application. Sensitive data elements within the data from the data source are identified via a discovery tool, and data definitions are generated for data elements and indicate the sensitive data elements. The data definitions include a plurality of properties for the data elements. An initial de-identification protocol is determined for each of the sensitive data elements based on the data definitions generated by the discovery tool and one or more rules associated with the sensitive data element. An interface enables a user to selectively alter the initial de-identification protocol for the sensitive data elements, wherein the rules are modified in accordance with the alteration to process subsequent data elements from the data source according to the alteration. The corresponding de-identification protocols are applied to the sensitive data elements to de-identify the sensitive data elements for the target application. Embodiments of the present invention further include a system and computer program product for dynamically de-identifying sensitive data in substantially the same manner described above.

DETAILED DESCRIPTION

Figure 1:
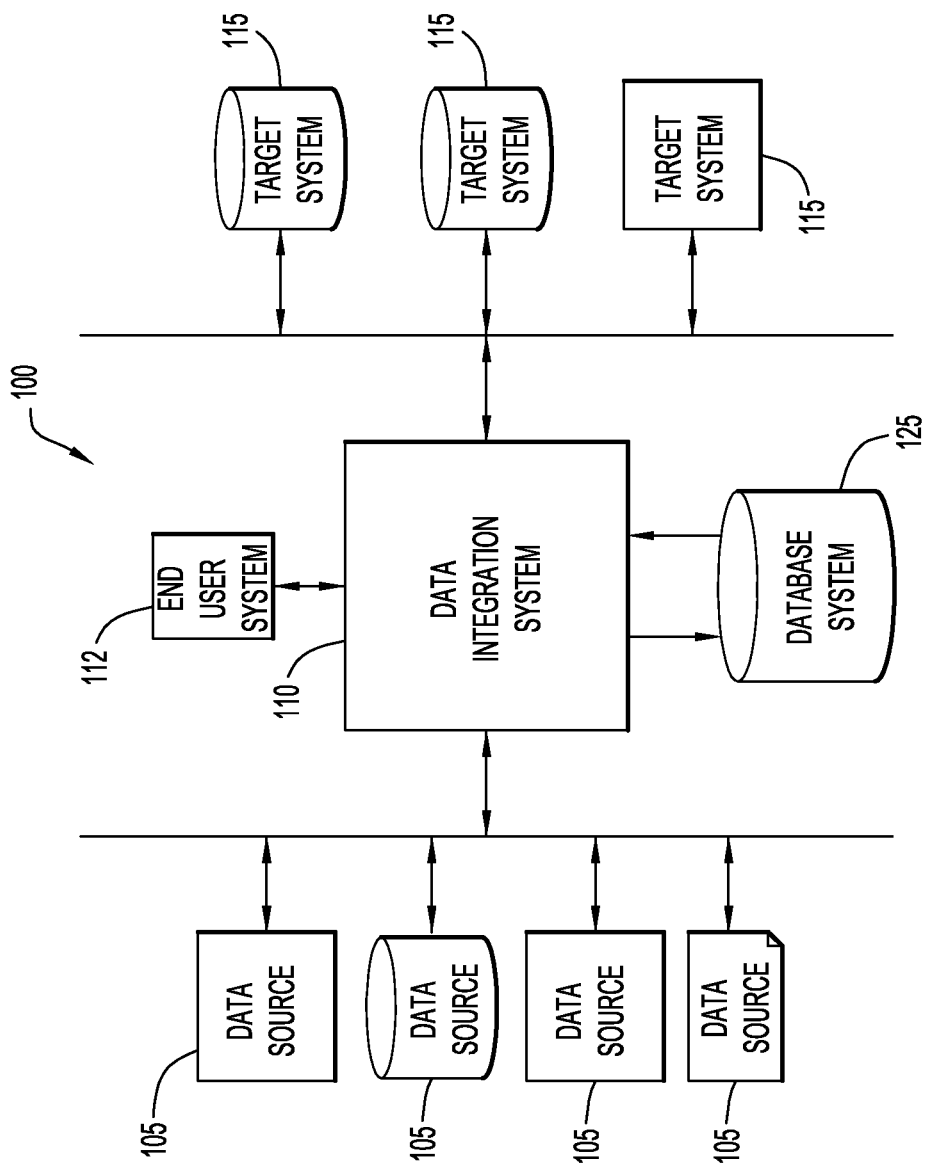
FIG. 1 is a diagrammatic illustration of a platform employed by a data integration system according to an embodiment of the present invention.

FIG. 1 represents a system or platform 100 for facilitating integration of various data of a business enterprise. The platform 100 includes a plurality of computer-implemented business processes, each of which may include a plurality of different computer applications and data sources. In this embodiment, the platform includes several data sources 105. These data sources 105 may include a wide variety of data sources (e.g., computer systems, database systems, applications, files, etc.) from a wide variety of physical locations. For example, the data source 105 may include database systems such as DB2®, (DB2® is a trademark of International Business Machines Corporation), as well as database systems or other application programs from many other sources, such as Oracle, Sybase, Microsoft, EMC, and, additionally, complex flat files, FTP files, or other systems or sources that provide data to the business enterprise. The data sources 105 may reside at various locations or they may be centrally located.

The platform 100 also includes a data integration system 110. The data integration system 110 is preferably in the form of a computer system, and may perform a number of functions, such as an ETL process to extract data from data sources 105 and provide the extracted data to target systems 115. The data integration system 110 may send commands to one or more of the data sources 105 such that the data source provides data to the data integration system 110. Since the data received may be in multiple formats with varying metadata, the data integration system 110 may reconfigure the received data such that it can be later combined for integrated processing.

The platform 100 also includes several target systems 115 and one or more end-user systems 112. The target systems 115 are preferably in the form of computer systems, and may include databases (such as a data warehouse) or processing platforms used to further manipulate the de-identified data communicated from the data integration system 110 (such as an operational data store). The end-user systems 112 may present a graphical user or other interface (e.g., command line prompts, menu screens, etc.) to solicit information from users that pertain to the desired tasks to be performed (e.g., de-identification or masking) and to associated information (e.g., resource requirements, parameters, etc.). The end-user systems 112 communicate information to the data integration system 110 so that the data integration system may utilize the information to cleanse, combine, transform or otherwise manipulate the data it receives from the data sources 105 and provide de-identified data to target systems 115. As a result, another system can use the processed data to produce reports useful to the business. The reports may be used to report data associations, answer complex queries, answer simple queries, or form other reports useful to the business or user.

The platform 100 may also include a database or database management system 125. The database system 125 may be used to store metadata or other information for the data integration system. For example, the data integration system 110 may collect data from one or more data sources 105 and transform the data into forms that are compatible with one or more target systems 115 in accordance with the information in database system 125. Once the data is transformed, the data integration system 110 may store the data in the database system 125 for later retrieval. By way of example, the database system 125 may be in the form of a database server.

The data sources 105, end-user systems 112, target systems 115, and database system 125 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, database access software, etc.).

The platform components 105, 110, 112, 115, 125 may communicate over a network. The network may be implemented by any number of any suitable communications media (e.g., wide area network (WAN), local area network (LAN), Internet, Intranet, etc.). Alternatively, the components 105, 110, 112, 115, 125 may be local to each other and/or and communicate via any appropriate local communication medium (e.g., local area network (LAN), hardwire, wireless link, Intranet, etc.).

Figure 2:
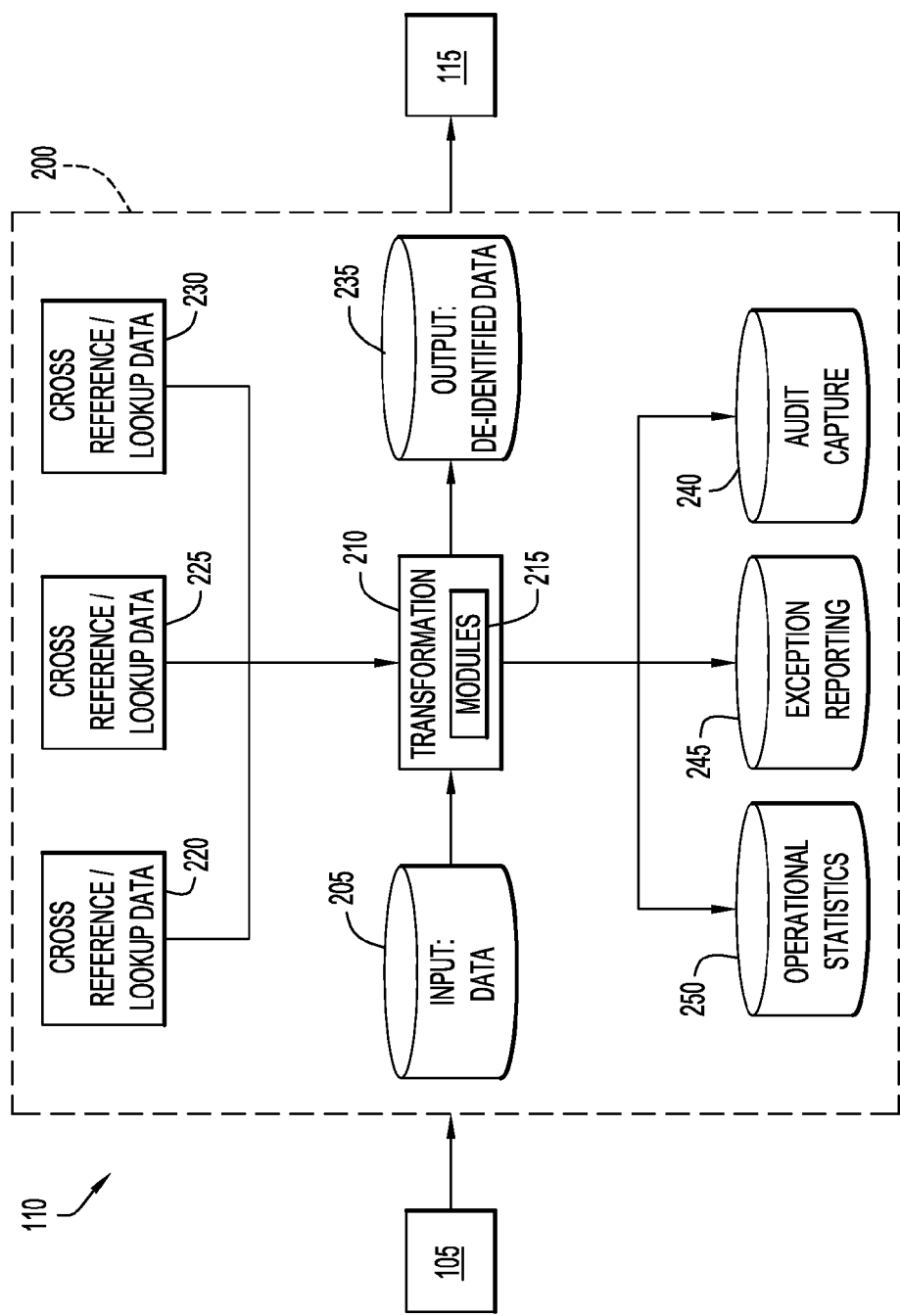
FIG. 2 is a diagrammatic illustration of an example data de-identification system according to an embodiment of the present invention.

FIG. 2 illustrates a data de-identification system 200 contained within the data integration system 110. The data de-identification system 200 may be implemented by any combination of software and/or hardware modules or units. Data 205 from data sources 105 include sensitive data (e.g., data including sensitive data elements that need to be de-identified to preserve the confidentiality of the data). The data 205 is received by the transformation facility or tool 210 having various modules 215 such as a data de-identification tool. The data integration system 110 preferably performs an ETL or other process, where the transformation facility 210 collects data 205 from data sources 105, and performs data discovery on data 205 to generate data definitions and identify sensitive data. One or more of the modules 215 selectively utilize cross-reference and/or lookup data 220, 225, 230 to identify the sensitive data. The cross-reference data 220, 225, 230 may further include information for data mapping, validation, and de-identification. The transformation facility 210 further de-identifies the sensitive data for the ETL or other process to generate output of de-identified data 235 for target systems 115 (discussed in greater detail below).

The transformation facility 210 may also generate an audit capture report stored in an audit capture repository 240, an exception report stored in an exception reporting repository 245 and an operational statistics report stored in an operational statistics repository 250. The audit capture report serves as an audit to record the action taken on the data. The exception report includes exceptions generated by the transformation facility 210. The operational statistics report includes operational statistics that capture file information, record counts, etc.

By way of example, the transformation facility 210 may include InfoSphere™ or DataStage® business applications, available from IBM®. (InfoSphere™ and DataStage® and IBM® are trademarks of International Business Machines Corporation).

Figure 3:
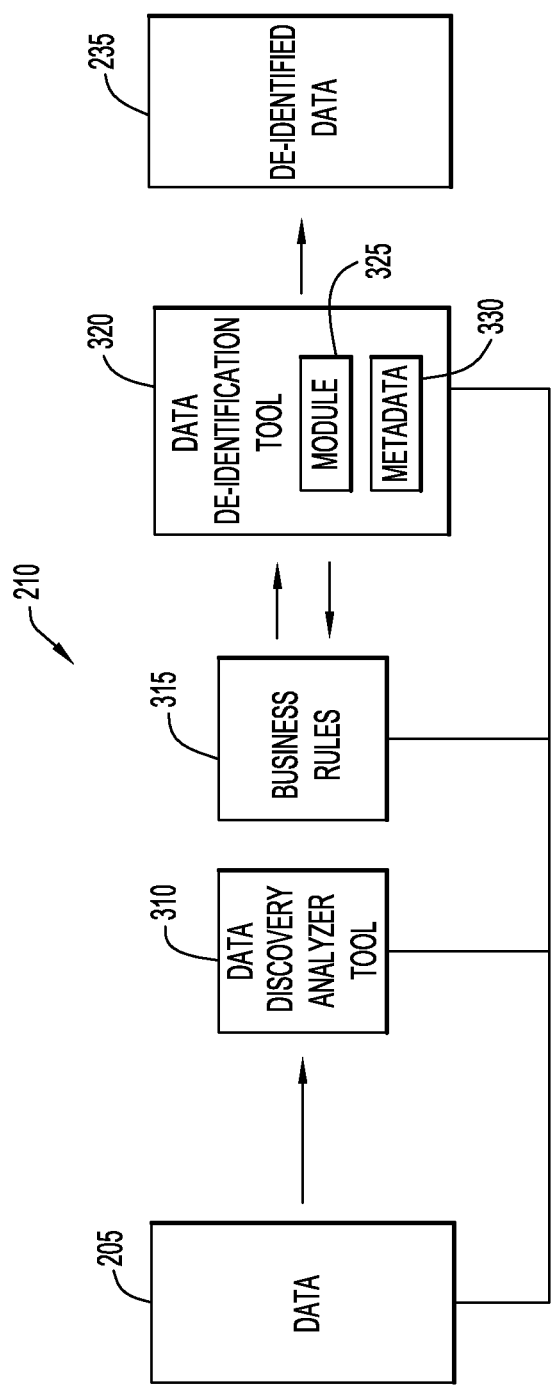
FIG. 3 is a diagrammatic illustration of a transformation tool within the data de-identification system in accordance with an embodiment of the invention.

FIG. 3 is a block diagram of the transformation facility 210 operable to de-identify or mask sensitive data (e.g., for an ETL or other process) while preserving data usability. In one embodiment, the facility 210 includes a data discovery/analyzer tool 310, business/information technology rules 315, and a data de-identification tool 320. The data discovery/analyzer tool 310 queries a data source 105 to extract and profile data. The data source 105 provides the data to the discovery/analyzer tool 310, which, in turn, facilitates communication of the extracted data to the other portions of the transformation facility 210 (e.g., the de-identification tool 320).

The discovery/analyzer tool 310 may extract data from a plurality of data sources 105, providing data to the transformation facility 210 that is to be normalized, cleansed, masked, and/or consolidated (e.g., into a central database or repository information manager). The discovery/analyzer tool 310 examines attributes, profiles, knowledge and relations to identify data fields within the extracted data and the particular fields containing sensitive data. The discovery/analyzer tool 310 generates data definitions for each field identified in the data. The data definitions each indicate various properties of a corresponding data field. By way of example, the data definition generated by the discovery/analyzer tool 310 for a data field may be in the form of an XML file including various parameters (e.g., the table containing the data field, the attribute or column of the table containing the data field, the type of field, an indication identifying the field as a sensitive data field, etc.).

The data discovery/analyzer tool 310 further performs data profiling that prepares, standardizes, matches, or otherwise manipulates the data to produce quality data to be later transformed. In other words, the discovery/analyzer tool 310 identifies and documents the sensitive data within data 205 from the data sources 105 (where the data is located and how it is linked across systems) by intelligently capturing relationships between data elements. The data discovery/analyzer tool further produces data definitions and determines the applicable transformations and business rules, thereby defining business objects.

By way of example, the data discovery/analyzer tool 310 may be a tool such as InfoSphere™ Discovery and/or a data analyzer software tool such as InfoSphere™ Information Analyzer, both of which are available from International Business Machines Corporation. These tools may be used individually or in concert.

Once sensitive data is identified by the discovery/analyzer tool 310, the sensitive data is automatically de-identified via the data de-identification tool 320. The data de-identification tool 320 utilizes de-identification modules 325 and metadata 330 to transform sensitive data elements into de-identified or masked data elements such that the data elements are desensitized (e.g., the de-identified data has a security risk that does not exceed a predetermined risk level). The data de-identification tool 320 receives the data 205, and de-identifies the sensitive data fields/elements to produce de-identified data 235. The protocol utilized by the data de-identification tool 320 is obtained from the business rules 315, which specify the de-identification protocol to be applied to the sensitive data (e.g., encryption, digit swapping, rounding, truncation, scrambling, etc). The de-identification protocol may be initially determined from business rules 315 and the data definitions generated by the discovery/analyzer tool 310, and/or may be selected by a user via a graphical user interface (discussed in greater detail below).

By way of example, the data de-identification tool 320 may be implemented by DataStage® products, including the Optim™ Data Privacy Solution, offered by International Business Machines Corporation.

Figure 4:
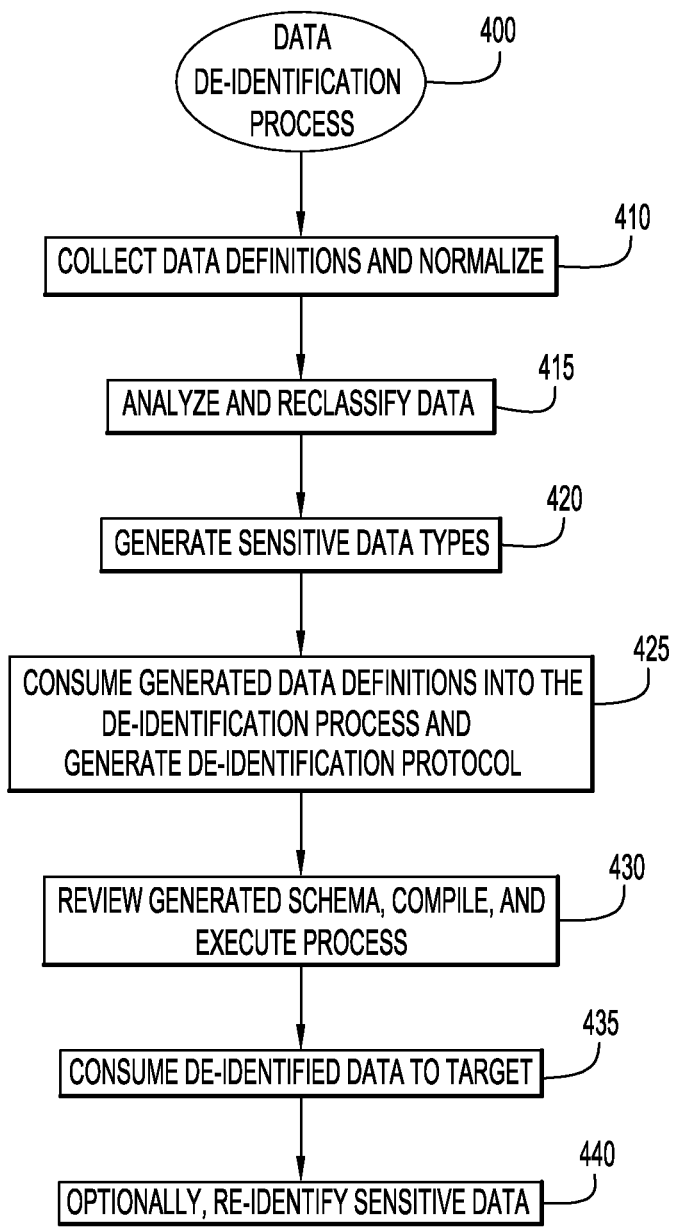
FIG. 4 is a procedural flow chart illustrating the manner in which the data is de-identified or masked according to an embodiment of the present invention.

FIG. 4 depicts a flow diagram of a data de-identification process 400 in accordance with an embodiment of the present invention. Initially, the data definitions for all data fields are collected and normalized at Step 410. Specifically, the discovery/analyzer tool 310 receives a command to extract data elements from one or more data sources 105. Following the receipt of an extraction command, the data discovery/analyzer tool 310 may identify the appropriate data sources 105 where the data to be extracted resides. The data source 105 may or may not be identified in the command. If the data source 105 is identified, the discovery/analyzer tool 310 may query the identified data source 105. In the event a data source 105 is not identified in the command, the discovery/analyzer tool 310 may determine the data source from the type of data requested from the data extraction command, from another piece of information in the command, or after determining the association to other data that is required. For example, the query may be for a customer address. The first portion of the customer address data may reside in a first database, while a second portion resides in a second database. The discovery/analyzer tool 310 may process the extraction command and direct its extraction activities to the two databases without further instructions in the command.

The discovery/analyzer tool 310 further normalizes the data so that like data elements are treated consistently in the data de-identification process, thereby reducing the set of data elements created from varying data names and mixed attributes. A non-normalized data name may be mapped to a corresponding normalized data name that is included in a set of pre-defined normalized data names. The normalization process is repeated so that the non-normalized data names are mapped to the normalized data names in a many-to-one correspondence.

One or more non-normalized data names may be mapped to a single normalized data name in the normalization process. For example, non-normalized data names (e.g., CUSTOMER-NAME, CORPORATION-NAME and CONTACT-NAME) may be mapped to a single normalized data name (e.g., NAME), thereby indicating that CUSTOMER-NAME, CORPORATION-NAME and CONTACT-NAME should be de-identified or masked in a similar manner. Further analysis into the data properties and sample data values of CUSTOMER-NAME, CORPORATION-NAME and CONTACT-NAME may be utilized to verify the normalization.

Once extracted, in Step 415, the data is analyzed and reclassified via the discovery/analyzer tool 310. In particular, the discovery/analyzer tool 310 analyzes data values and data patterns to identify overt relationships, as well as hidden relationships that link disparate data elements into logical groupings of related data or business objects. The tool 310 further creates mapping specifications to transform data into a consumable format for a target application based on business requirements, where these disparate data elements are linked into logical units of information or business objects.

The discovery/analyzer tool 310 further identifies sensitive data within the extracted data. By way of example, the discovery/analyzer tool 310 may locate confidential data elements contained within larger fields or separated across multiple columns. The discovery/analyzer tool 310 further identifies the transformation rules that are applied to the source system when populating a target system 115 (e.g., a data warehouse or an operational data store).

Once the sensitive data is identified, the discovery/analyzer tool 310 generates data definitions for all of the data fields at Step 420. As noted above, the data definition may be an XML file including a schema, where sensitive data may be identified utilizing patterns contained within and across data elements. The data definition may identify the location of the data (e.g., table or other location), attributes of the data, the general type of data (e.g., whether the data is sensitive or non-sensitive), the general data category (age, etc.), and the data type (e.g., social security number, credit card number, etc.). The data definitions are utilized by the de-identification tool 320 at Step 425 to automatically apply the predetermined de-identification protocol. Specifically, the de-identification protocol (e.g., encryption, truncation, etc.) is selectively applied to a data element or to a group of data elements based on the type of sensitive data contained in the data definition (e.g., credit card number, social security number, etc.), and the business rules 315 that define the protocol for that particular type of sensitive data. In other words, business rules 315 are applied to a sensitive data element discovered by the discovery/analyzer tool 310 to determine the de-identification protocol. For example, a business rule may require certain data to be de-identified based on a certain de-identification protocol. The protocol is initially determined based on the data definitions and the business rules, and may be later altered by a user via a graphical user interface as described below. The business rules are initially predetermined by a user, and are altered in accordance with changes made by the user on the graphical user interface.

With the above-described configuration, the discovery/analyzer 310 tool enables identification of confidential data across environments by examining values across multiple sources to determine complex rules and transformations that may hide sensitive content and forms data definitions utilized by the de-identification tool 320 to apply the default de-identification protocol required by the business rules 315. In addition, any new data consumed by the discovery/analyzer tool (e.g., any data consumed by the discovery/analyzer tool 310 after the completion of the initial re-identification process) would be automatically de-identified in accordance with the data definition and business rules applied to the previously de-identified data.

A user may initiate the above described process from an end-user system 112 utilizing an interface application of the transformation system 210. In addition, a user may selectively alter the de-identification protocol applied to sensitive data through the use of the interface application. In particular, the transformation system 210 may include an interface application or module that presents a graphical user interface (GUI) to the user via an end-user system 112 that enables the selection of a de-identification protocol. Any number or type of user interfaces (e.g., Graphical User Interface (GUI), command-line, prompt, etc.) may be utilized, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Figure 5A:
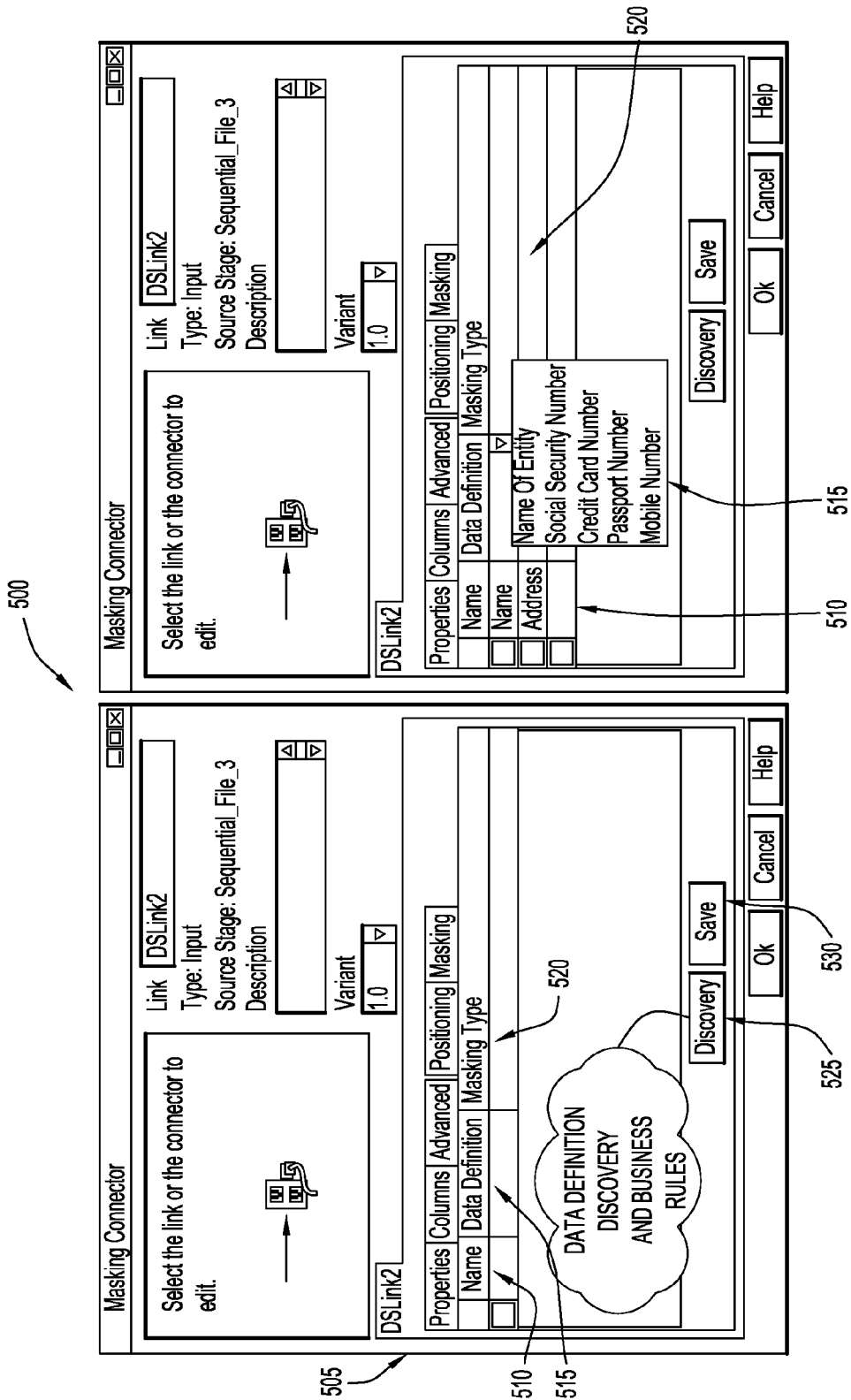
FIGS. 5A and 5B illustrate a graphical user interface through which a user can define parameters of a data de-identification or masking process for an ETL or other job.
Figure 5B:
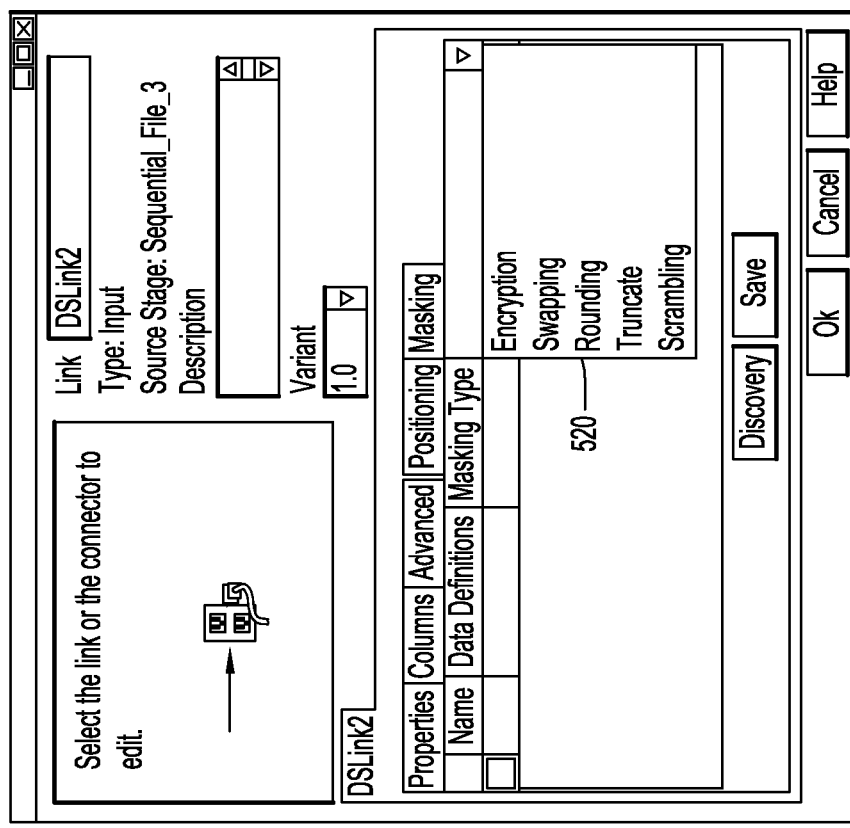

FIGS. 5A and 5B show a graphical user interface 500 in accordance with an embodiment of the present invention through which an end user can utilize the data definitions formed by the discovery/analyzer tool 310 to automatically apply a corresponding de-identification protocol (e.g., to define the parameters of the data de-identification process) during design of an ETL or other job. Thus, in the example depicted in FIG. 5A, the graphical interface 500 includes a series of parameters 510, 515, 520 for a particular link where the data de-identification process 505 can access any suitable data source 105 and deliver data to any suitable target system 115, as described above. The graphical interface may present data relating to a connector/operator or a link within a flow. For example, parameter 510 provides a name field ("Name"), while parameters 515, 520 each provides a drop down menu for a sensitive data type ("Data Definition") and de-identification protocol ("Masking Type"), respectively.

The parameters for the connector/operator or link may be populated by information obtained by the discovery/analyzer tool 310 upon activation of discovery button 525. The discovery button 525 may enable importation of the data definitions from discovery/analyzer tool 310 when the discovery/analyzer tool has been previously executed for a desired data set. Alternatively, the discovery button 525 may initiate the discovery/analyzer tool 310 to extract data from the data sources 105, identify data fields and generate the data definitions. The data definitions are utilized to populate the fields as described above. This may be utilized in order to generate data definitions for any new or modified data.

The interface may determine initial values for the parameters 510, 515, 520 based on the data definitions and the business rules 315 as described above. For example, the data field parameter 510 may be populated with the single, normalized data name mapped to (a non-normalized) sensitive data type discovered by the discovery/analyzer tool 310 ("CC No."), as described above. The data type parameter 515 may then be populated with the data type associated with the data contained in the data field parameter based on the data definition. An initial de-identification protocol may be populated into the parameter 520 based on the data definition and business rules 315.

Once populated, the user may selectively modify the sensitive data type designation (parameter 515), and the de-identification protocol (parameter 520) of the corresponding sensitive data element (parameter 510). By way of example, parameter 515 provides a drop down menu with various data types (e.g., Name of Entity, Social Security Number, Credit Card Number, Passport Number, Mobile Number, etc.) that may be utilized to modify the sensitive data type corresponding to the associated data field (parameter 510). By way of further example, parameter 520 provides a drop down menu with various de-identification protocols (e.g., Encryption, Swapping, Rounding, Truncate, Scrambling, etc.) from which the user may select the de-identification protocol to associate with the sensitive data type (parameter 515). However, the present invention embodiment may provide any other suitable parameters, and employ any conventional or other data types and de-identification protocols.

Alternatively, a user may enter a name and the interface application may retrieve parameter values for the entered name from the data definitions. If the name does not correspond to identify sensitive data, the user may further enter information for the parameters to, in effect, render the field sensitive, where some of the information may be retrieved from the corresponding data definition.

In this manner, information may either be automatically populated from the data definitions, and/or entered by a user. For example, the user may identify a data field 510 ("name," "cc no."), select the corresponding data type 515 contained within the discovery and analysis tools ("Name of Entity," "Credit Card Number"), and then specify the desired level of de-identification or masking to apply to those the data elements forming the data field 510. By way of example, an "encryption" de-identification protocol may be applied to credit card information, and a "data swap" de-identification protocol may be applied to a customer address. With this configuration, the different de-identification protocols may be applied (e.g., encryption, swapping, rounding, truncate, scrambling, relational group swap, incremental autogen, string replacement, universal random, etc.) as determined by the interface application from the data definitions, from information modified/entered by a user, and/or from a desired security level (e.g., random, key/swap hashing, corporate sensitive, enhance security, legal requirement, etc.).

Once the user alters the parameters, business rules 315 are updated by the interface application to reflect the altered parameters. In this manner, subsequent data provided to the data integration system will automatically be de-identified according to the changes. In addition, the graphical user interface may enable a user to enable or disable maintenance of affinity for the de-identification. Specifically, affinity is maintained when the results of an operation for the de-identified data are similar to results of the operation for unmasked data. For example, with respect to a sort operation, the de-identification protocol ensures that the resulting de-identified data produces the same results or order from the sort operation as the unmasked data (even though the values for the de-identified data are different). By way of example, three unmasked data elements with values of 1, 2, 3 may be de-identified to contain values of 25, 50, 75 in order to provide the same resulting order from a sort operation and maintain affinity. When affinity is to be maintained, the corresponding de-identification protocols that are capable of maintaining the affinity for one or more operations are presented for selection by a user (thereby disabling the de-identification protocols that cannot maintain affinity). The desired operations for affinity maintenance may be further specified by a user.

Once the de-identification protocol is determined, the appropriate de-identification modules 325 are accessed for the ETL or other job. At Step 430 (FIG. 4), the generated schema is reviewed, the data and modules (e.g., de-identification modules) are compiled for the ETL or other job, and the job is executed to produce de-identified data in accordance with the de-identification protocol. The appropriate de-identification modules de-identify or mask the data in accordance with the specified protocol from the interface. Any entered parameters may be saved upon activation of save button 530.

The de-identification tool 320 involves the de-identification modules 325 through batch or real time transactions and supports any of a plurality of database types on a variety of platforms (e.g., mainframe and/or midrange platforms). The de-identification tool 320 reuses the data de-identification modules 325 that support the business rules 315, and that align with the normalized data fields so there is assurance that the same data is transformed consistently irrespective of the physical file in which the data resides, and irrespective of the technical platform of which the data is a part. Still further, the de-identification tool 320 keeps a repository of reusable components from data definitions and reusable de-identification modules that facilitate repeatable and consistent software development.

At Step 435, the de-identified data is delivered as output 235 to be consumed into the business application of the target system 115. Once de-identified, the data can be re-identified or unmasked at Step 440 based on the business rules 315 and sensitive data definitions, provided the user has clearance to initiate the unmasking process.

New data entering the integration system 110 may be automatically processed in a similarly manner. In other words, new data entering the system is automatically de-identified or masked in accordance with the de-identification protocol selected via the interface application and the corresponding business rules.

Thus, the above-described invention provides a method that is capable discovering the data, analyzing the data for sensitivity, determining business rules and/or information technology (IT) rules that are applied to the sensitive data, selecting a de-identification method based on the business and/or IT rules, and executing the selected de-identification method to replace the sensitive data with fictional data for storage or presentation purposes. The execution of the de-identification may generate desensitized (i.e., non-sensitive) data that allows the business application to remain fully functional.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for dynamically de-identifying sensitive data from a data source for a target application, the computer program product comprising a non-transitory computer readable storage medium having computer readable program code embodied therewith, the computer readable program code being configured to:

receive data definitions generated by a discovery tool for data elements, wherein, the discovery tool identifies sensitive data elements within data from a data source, arid wherein the data definitions indicate the sensitive data elements and include a plurality of properties for the data elements including a type of sensitive data contained within the sensitive data elements determined by the discovery tool;

determine an initial de-identification protocol for each of the sensitive data elements based on the properties of the data definitions of the sensitive data elements generated by the discovery tool and one or more predetermined rules, wherein the one or more predetermined rules specify a de-identification protocol for each sensitive data element based on the determined type of sensitive data contained in that sensitive data element;

alter the determined initial de-identification protocol of a sensitive data element to a different user-selected de-identification protocol and at least one property indicated by the data definition for a sensitive data element via a user interface, wherein the at least one property includes the determined type of sensitive data;

modify the predetermined rules in accordance with the user-selected de-identification protocol and the altered at least one property to process subsequent data elements from the data source according to the modified rules to be applied to the subsequent data elements; and apply the corresponding de-identification protocols to the sensitive data elements to de-identify the sensitive data elements for the target application.

2. The computer program product of claim 1, wherein the user interface further provides enablement or disablement of maintenance of affinity for the de-identification, wherein maintenance of affinity enables operators to produce results for de-identified data in an order that corresponds to an order of results for unmasked data.

3. The computer program product of claim 2, wherein the de-identification protocols that maintain affinity are determined and presented by the user interface in response to the affinity enablement, thereby disabling remaining de-identification protocols.

4. The computer program product of claim 1, wherein the de-identification is for an Extract Transform Load (ETL) job.

5. The computer program product of claim 1, wherein the computer readable program code is further configured to populate the user interface with the sensitive data elements based on the generated data definitions.

6. The computer program product of claim 1, wherein the computer readable program code is further configured to selectively re-identify a de identified data element to produce an unmasked data element.

7. A system for dynamically de-identifying sensitive data from a data source for a target application, the system comprising a computer system including at least one processor configured to:

receive data definitions generated by a discovery tool for data elements, wherein the discovery tool identifies sensitive data elements within data from a data source, and wherein the data definitions indicate the sensitive data elements and include a plurality of properties for the data elements including a type of sensitive data contained within the sensitive data elements determined by the discovery tool;

determine an initial de-identification protocol for each of the sensitive data elements based on the properties of the data definitions of the sensitive data elements generated by the discovery tool and one or more predetermined rules, wherein the one or more predetermined rules specify a de-identification protocol for each sensitive data element based on the determined type of sensitive data contained in that sensitive data element;

alter the determined initial de-identification protocol of a sensitive data element to a different user-selected de-identification protocol and at least one property indicated by the data definition for a sensitive data element via a user interface, wherein the at least one property includes the determined type of sensitive data;

modify the predetermined rules in accordance with the user-selected de-identification protocol and the altered at least one property to process subsequent data elements from the data source according to the modified rules to enable the de-identification protocols indicated by the modified rules to be applied to the subsequent data elements; and apply the corresponding de-identification protocols to the sensitive data elements to de-identify the sensitive data elements for the target application.

8. The system of claim 7, wherein the user interface further provides enablement or disablement of maintenance of affinity for the de-identification, wherein maintenance of affinity enables operators to produce results for de-identified data in an order that corresponds to an order of results for unmasked data, 9. The system of claim 8, wherein the de-identification protocols that maintain affinity are determined and presented by the user interface in response to the affinity enablement, thereby disabling remaining de-identification protocols.

10. The system of claim 7, wherein the de-identification is for an Extract Transform Load (ETL) job.

11. The system of claim 7, wherein the at least one processor is further configured to populate the user interface with the sensitive data elements based on the generated data definitions.

12. The system of claim 7, wherein the at least one processor is further configured to selectively re-identify a de-identified data element to produce an unmasked data element.

\* \* \* \* \*